United States Patent
Frey

(10) Patent No.: US 11,004,151 B2
(45) Date of Patent: May 11, 2021

(54) OPTIONS TOOL AND USER INTERFACE

(71) Applicant: OptionsGeek, LLC, White Plains, NY (US)

(72) Inventor: Felix Frey, White Plains, NY (US)

(73) Assignee: OPTIONSGEEK, LLC, White Plains, NY (US)

(*) Notice: Subject to any disclaimer, the term of this patent is extended or adjusted under 35 U.S.C. 154(b) by 0 days.

(21) Appl. No.: 16/985,799

(22) Filed: Aug. 5, 2020

(65) Prior Publication Data

US 2021/0073914 A1 Mar. 11, 2021

Related U.S. Application Data

(60) Provisional application No. 62/896,027, filed on Sep. 5, 2019.

(51) Int. Cl.
| | |
|---|---|
| *G06Q 40/00* | (2012.01) |
| *G06Q 40/06* | (2012.01) |
| *G06F 3/0484* | (2013.01) |
| *G06Q 40/04* | (2012.01) |

(52) U.S. Cl.
CPC ......... *G06Q 40/06* (2013.01); *G06F 3/04847* (2013.01); *G06Q 40/04* (2013.01)

(58) Field of Classification Search
CPC ........ G06Q 40/00; G06Q 40/06; G06Q 40/04; G06F 3/04847
See application file for complete search history.

(56) References Cited

U.S. PATENT DOCUMENTS

| | | |
|---|---|---|
| 2001/0056391 A1 | 12/2001 | Schultz |
| 2007/0219895 A1 | 9/2007 | Cooper et al. |
| 2008/0071694 A1 | 3/2008 | Blomgren et al. |
| 2008/0270322 A1 | 10/2008 | Cooper et al. |
| 2009/0132333 A1* | 5/2009 | Sheffer ............ G06Q 10/06315 705/7.25 |
| 2009/0240632 A1* | 9/2009 | Cunningham ......... G06Q 40/06 705/36 R |
| 2014/0214645 A1 | 7/2014 | Frey |

OTHER PUBLICATIONS

Essays on financial innovations Charupat, Narat. York University (Canada), ProQuest Dissertations Publishing, 1997. NQ22887. (Year: 1997).*
Option-Aid: Calculate Expectation and important Statistics, Web Archives, pp. 1-2, Jun. 2010.
Hoadley, P., Option Strategy Analysis Tools, Web Archives, Jan. 2008, pp. 1-11.
Kaeppel, J.: The Dangerous Lure of Cheap Out-of-the Money Options, Mar. 2010, Yahoo Finance, pp. 1-4.

(Continued)

*Primary Examiner* — Lalita M Hamilton
(74) *Attorney, Agent, or Firm* — Panitch Schwarze Belisario & Nadel LLP

(57) ABSTRACT

Aspects of the present disclosure may address education of users about options and may further address the choice of options to be recommended to a given user, based on the user's confidence about a chosen target asset price underlying the options. Methods directed to such applications may be computer-implemented or otherwise implemented.

21 Claims, 9 Drawing Sheets

(56) References Cited

OTHER PUBLICATIONS

Meizinger, S.: Trading with or against the skew, Apr. 2010, Expiring Monthly, pp. 1-8.
Hoadley Trading & Investment Tools, Software for Options Traders & Portfolio Investors, Apr. 20, 2011, Internet Archives, pp. 1-10.
North Suburban Trading Corporation: Educational Software for Option Traders, NSTC Position Analyzer, 2012, pp. 1-4.
North Suburban Trading Corporation: Educational Software for Option Traders, 2012, pp. 1-4.
Options Consulting Group, LLP: Geek Tools User Manual, 2012, www.myoptionsgeed.com, pp. 1-32.

* cited by examiner

OPTIONS TOOL AND USER INTERFACE

FIELD

Some aspects of this disclosure may relate to tools that may be used for directing a user to candidate financial options for investment.

BACKGROUND

An option is a contract that gives its purchaser the right, but not the obligation, to buy or sell an underlying asset or instrument at a specified strike price on or before a specified date. The seller of the option incurs a corresponding obligation to fulfill the transaction if the holder elects to exercise the option prior to expiration of the option on the specified date. The buyer pays a premium to the seller for this right. An option that conveys the right to buy something at a specific price is called a call; an option that conveys the right to sell something at a specific price is called a put.

Options may be bought and sold. That is, there may be a market for options. Such a market may be expressed in the form of an "options chain," an example of which is shown in FIG. 1. An options chain 100 may allow a user to enter, for example, a stock ticker symbol 10, and the options chain may then display information 11 about the stock (which may include, e.g., a current price). The options chain may further enable the user to enter an option expiration date 12. On the basis of these inputs, the option chain may generate a table or other display of put and/or call options, which may be displayed based on strike price 13. The table may include pricing information for call options 14 and/or for put options 15, which may be in the form of bid and ask prices for a given option for the expiration date 12 and the strike price 13. The table may include further information, such as volume (number traded) and/or open interest (total number in existence) for a given option (i.e., corresponding to expiration date 12 and strike price 13). Note that all of the information displayed in the options chain of FIG. 1 is either user input (indication of desired stock/commodity) or may be obtained from a service (e.g., the API Data Feed). Other well-known types of information, such as implied volatility, last option price, etc., may also be displayed. An options chain may thus provide its viewer with a "landscape" of what the options market looks like for a given stock, commodity, etc.

While existing options chains may provide the user with valuable information about the options market for a given stock, commodity, etc., it provides no information that might indicate to the user what might be good options in which the user may invest. Note that "asset" will be used below to refer to a stock, commodity, etc., which may be underlie options. In U.S. patent application Ser. No. 13/753,323, filed on Jan. 29, 2013 and published on Jul. 31, 2014 as U.S. Patent Application Publication No. 2014/0214645, hereby incorporated by reference in its entirety, the present inventor created an options tool and underlying methods that created and displayed valuations of options (i.e., answering the question as to whether an option is "cheap" or "expensive"). However, while providing further information to users, this still is only a question underlying the real question that most users ask, which is in which of the available options the user should actually invest.

Therefore, it would be desirable to provide further tools that may provide a given user with some indication as to which options might be the "best" options for investment.

SUMMARY

The present disclosure may present new methods, displays and/or user interfaces that may provide options chains, or equivalent information, that may better assist the potential investor to determine options in which to invest, for American-style options. The user interface may enable the user to input a target strike price and to indicate a "confidence level" that the option will reach that strike price. The target strike price and the confidence level may enable computations to provide recommendations of which options in an options chain may be desirable for the user, given the target strike price and the confidence level. This improved user interface and associated computations may facilitate an improved display that provides information that has not previously been enabled to be shown in prior-art options chains, and which may efficiently provide the user with this additional information in such a way as to make it easily useful.

Various aspects of the present disclosure may take the form of hardware, software, firmware, or combinations thereof, and software forms may be in the form of instructions embodied on a non-transitory computer-readable medium, such as, but not limited to, various forms of memory.

BRIEF DESCRIPTION OF THE DRAWINGS

Various aspects of this disclosure will now be described in detail in conjunction with the accompanying drawings, in which.

DETAILED DESCRIPTION

There may be three possible outcomes for an option at expiration: (a) in-the-money (ITM); (b) at-the-money (ATM); and (c) out-of-the-money (OTM). If an option expires ITM, this is a positive outcome (for a put option, this means that the strike price is above the market price of the asset; for a call option, this means that the strike price is below the market price of the asset). Expiring ATM means a neutral outcome (where the strike price is the market price). Expiring OTM is a negative outcome (opposite of ITM). Often, ATM is considered an OTM outcome.

Figure 1:
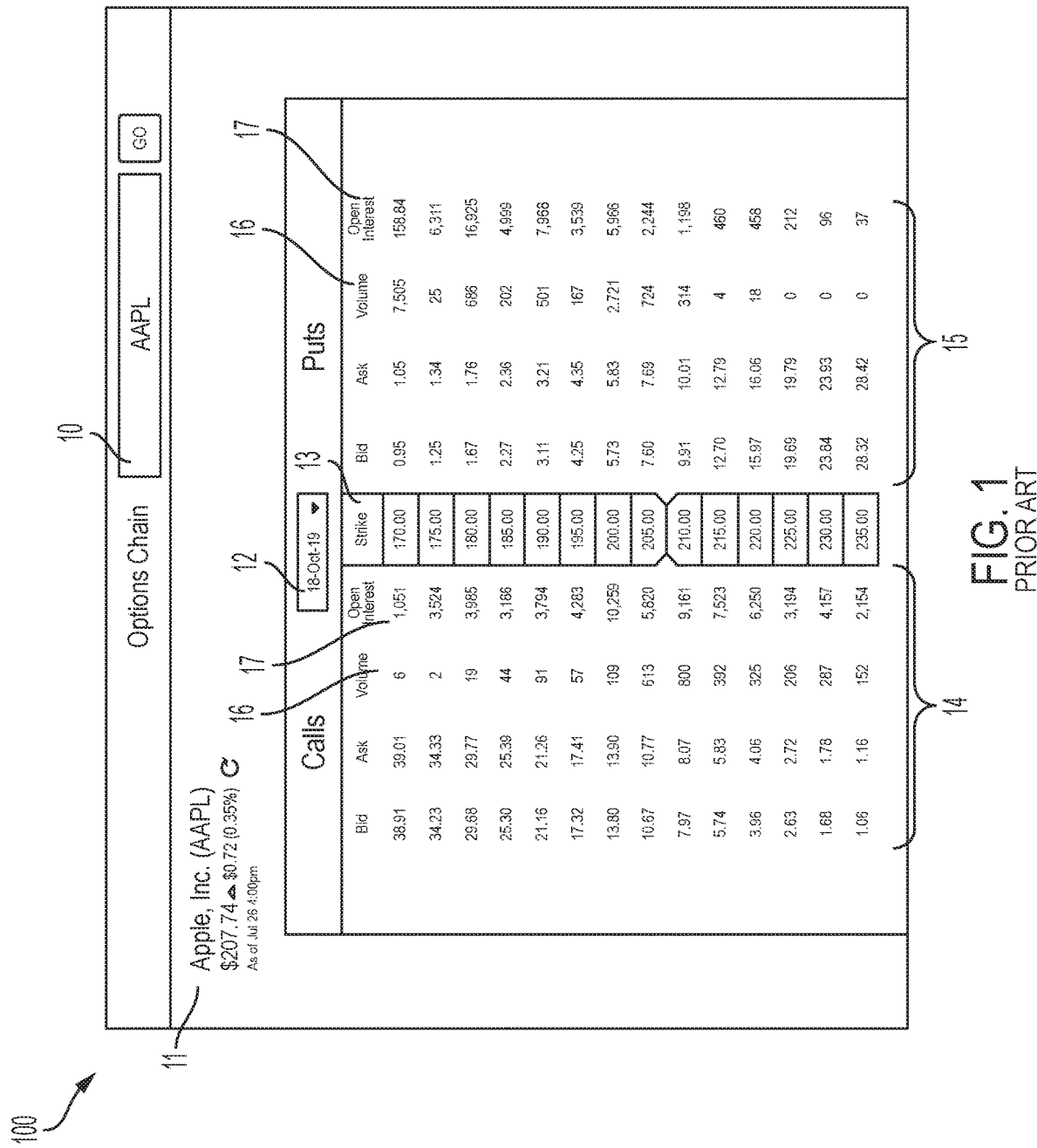
FIG. 1 shows an example of an options chain, as described according to aspects of this disclosure.
Figure 2:
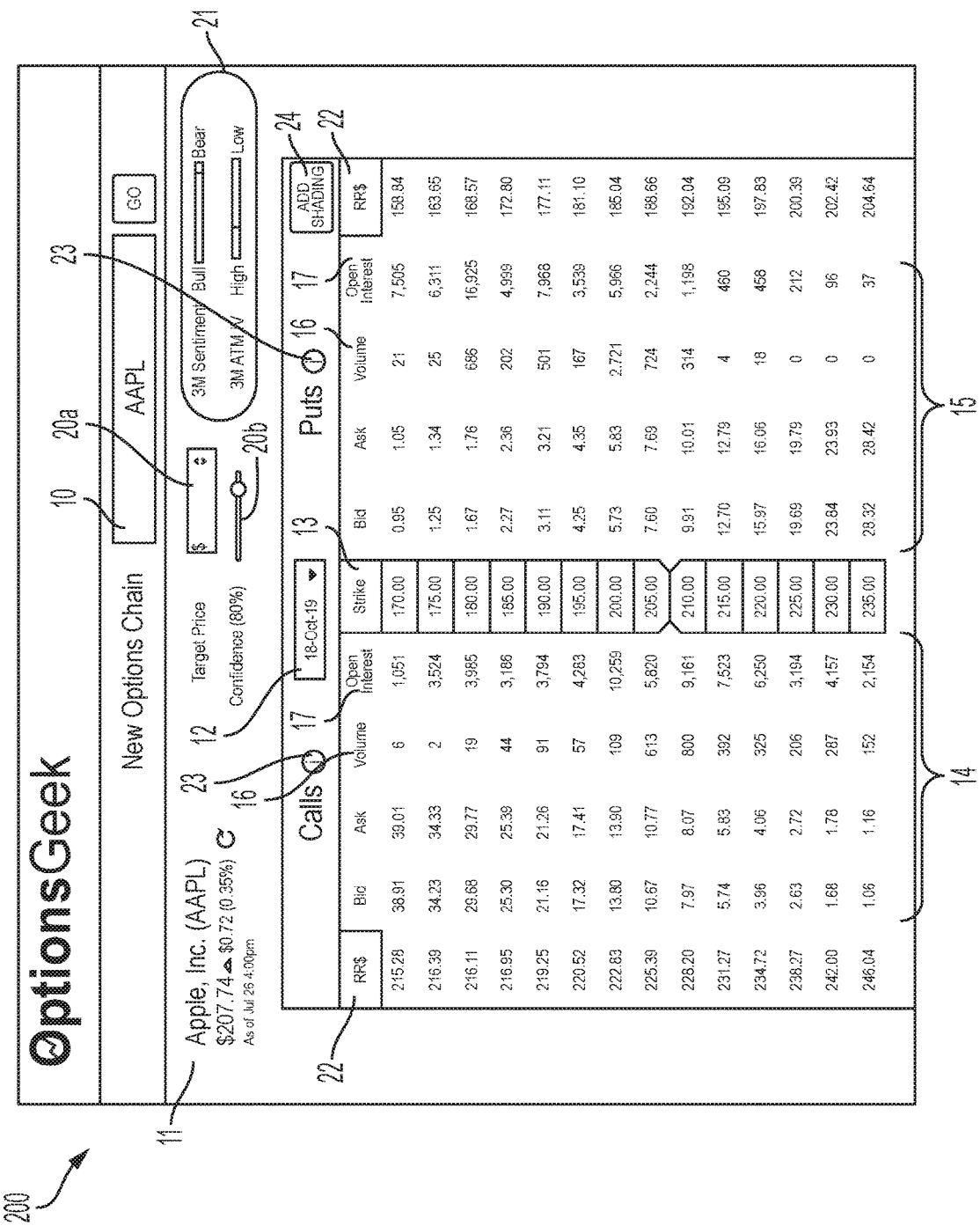
FIG. 2 shows an example of an enhanced options chain according to an aspect of this disclosure.

FIG. 2 shows an example of an enhanced options chain 200 according to aspects of the present disclosure. Enhanced options chain 200 may incorporate all of the features of options chain 100, as well as additional features not found in options chain 100. Notably, in addition to an input for an indicator of the asset of interest 10 and a desired expiration date 12, options chain 200 also includes, as part of its user interface, fields 20a and 20b that enable a user to enter a target price 20a and the user's confidence that this target price will be reached 20b. The target price 20a may, for example, be typed in as a numerical input, and/or up- and down-arrows or buttons may be available to enable the user to increase or decrease the target price 20a (or to enter target price 20a). User confidence 20b may be expressed as a percentage or on any other scale. The user may use a slider, dial, arrows/buttons or the like to enter the user's confidence level 20b. According to one aspect, the confidence level 20b may be typed in as a numerical value and/or adjusted using one of the aforementioned devices (i.e., slider, dial, etc.). This display/user interface may be provided on a display, such as a computer monitor, television, etc., and may be generated, for example, by a computing device (computer(s), processor(s), etc.), which may be collocated or remote (i.e., connected via a communication network, such as the Internet, a wireless network, etc.).

Another added field 21 may provide three-month sentiment ("3M Sentiment") and three-month at-the-money implied volatility ("3M ATM IV"). The former is a gauge of bullish or bearish sentiment by the options market over the preceding three-month period and may be determined, for example, as a skew between puts and calls. The latter is a measure of implied volatility for at-the-money options over the preceding three-month period (and it is noted that values for ATM IV may be determined using various models for options pricing, using the ATM options price, and back-solving for implied volatility (which may, e.g., be a variance or standard deviation)).

Columns 22 may provide Risk Reward Break-Even Prices ("RR$") for various strike prices for puts and calls. In particular, the value of RR$ may be computed according to the following formulas:

$$RR\$(\text{call}) = \text{Strike Price} + \frac{\text{Call Premium}}{\%ITM}, \text{ and} \quad (1a)$$

$$RR\$(\text{put}) = \text{Strike Price} - \frac{\text{Put Premium}}{\%ITM}, \quad (1b)$$

where % ITM represents a percentage probability that the value of the asset is ITM when the option expires. The % ITM may be provided by a data service. The call premium and the put premium are amounts per share (noting that an option represents a right to sell or purchase a particular amount of the underlying asset at a given price (the strike price), expressed in units, stated here as "shares," but which may be generalized to include other units, such as pounds, barrels, liters, bonds, etc.) that may be paid to the writer (seller) of the option by the purchaser of the option (this may be likened to a commission received by the writer). Note that in Equations (1a) and (1b), as in subsequent equations, X(put) refers to a quantity computed for put options, and X(call) refers to a quantity computed for call options.

It is further noted that the enhanced options chain 200 includes information buttons 23 that a user may click on or otherwise activate to obtain further information about either the put side or the call side of enhanced options chain 200. Additionally, an "Add Shading" button 24 may be provided, to permit the user to have the option of adding shading to the display.

Figure 3:
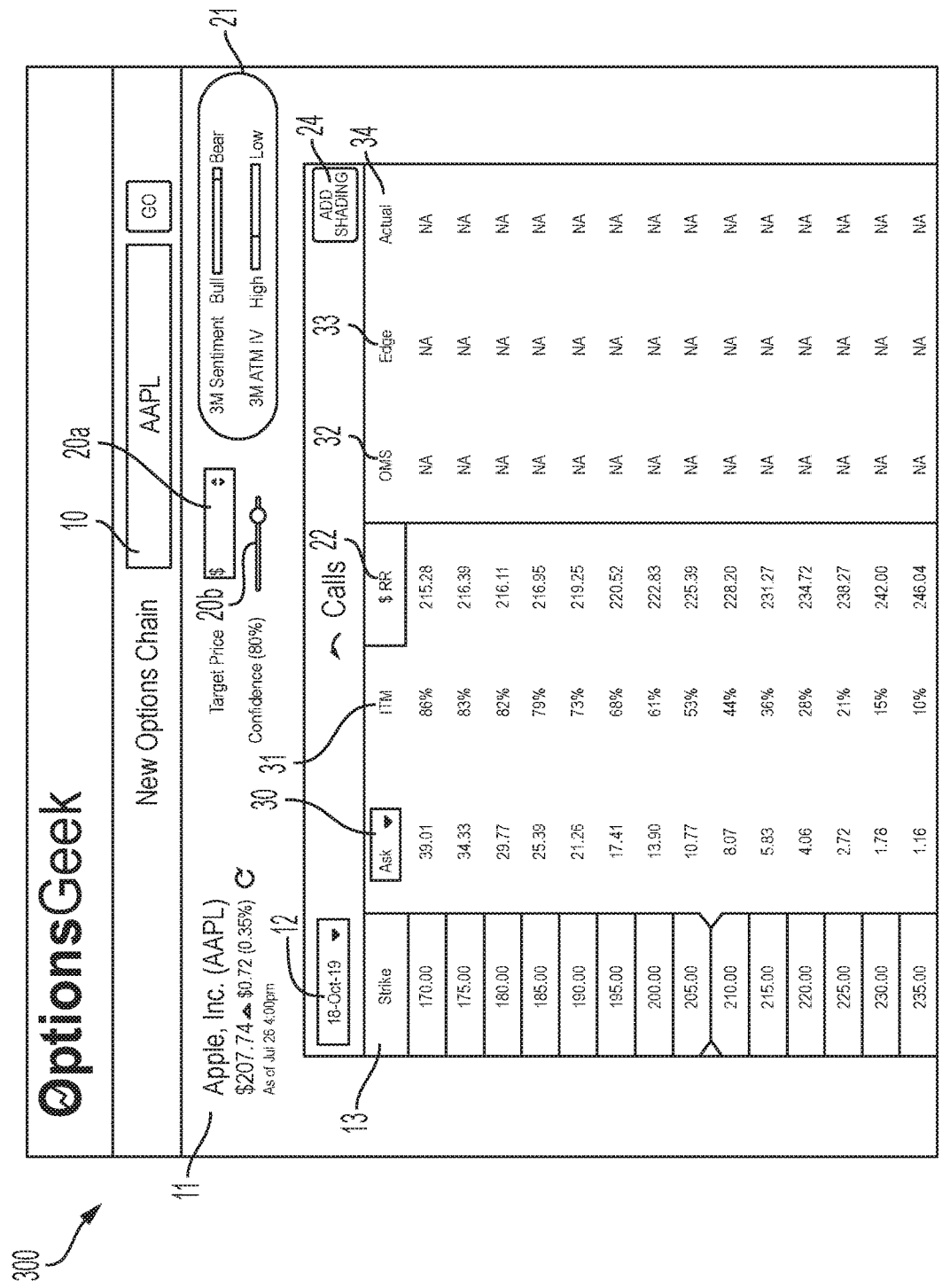
FIG. 3 shows an example of a further information display according to an aspect of this disclosure.

As noted above, information buttons 23 provide the user with the option to obtain further information about the respective side, put or call, of the enhanced options chain. FIG. 3 shows an example of a display showing such further information for an example call side; further information for the put side may be the same or similar. Further information display 300 may include various fields/columns found in the enhanced options chain 200 (10-13, 20-22, 24), which may help the user keep track of the underlying asset (stock, commodity, etc.), and may even permit the user to obtain the enhanced information for other assets by entering a different asset indicator in field 10 and/or for different dates by varying expiration date 12; note that, according to some aspects of the present disclosure, an expiration date may be chosen using a drop-down menu, direct entry of a date, etc.

Further information display 300 may include additional fields, in addition to the previously-discussed fields. For example, one column 30 may represent an option price. Column 30 may include a drop-down menu that may permit the user to view an ask price (shown), a bid price, or a middle ("mid") price for the option at various strike prices 13. The mid price may be an average or weighted average (e.g., but not limited to, based on volume or open interest) of the bid and ask prices. The bid/ask/mid prices correspond to the respective put premium or call premium (depending upon which further information display 300 is being viewed).

Column 31 may show the % ITM for options at each strike price 13 for the given date 12.

Column 32 may show values of Options Margin of Safety (OMS). This may indicate differences between the user's expectations and the market's expectation. OMS may be computed as follows:

$$OMS(\text{call}) = \begin{cases} TSP - RR\$(\text{call}), & \text{if } TSP > RR\$(\text{call}) \\ NA, & \text{otherwise} \end{cases}; \quad (2a)$$

$$OMS(\text{put}) = \begin{cases} RR\$(\text{put}) - TSP, & \text{if } TSP < RR\$ \\ NA, & \text{otherwise} \end{cases}; \quad (2b)$$

where TSP represents the user's entered Target Stock Price, as may be entered by the user in field 20a, and RR$(call) and RR$(put) are as shown in Equations (1a) and (1b).

A further column 33 may show values of Edge. Edge may be represented in the form of a percentage, for example (but is not limited thereto), and may indicate an amount of mathematical edge received when purchasing a particular option corresponding to an expiration date 12 and strike price 13. Edge may be determined as follows:

$$\text{Edge(call)} = \begin{cases} \dfrac{\%ITM \times (TSP - \text{Strike Price} - \text{Call Premium}) - (100\% - \%ITM) \times \text{Call Premium}}{\text{Call Premium}}, & \text{if} > 0; \\ 0, & \text{otherwise} \end{cases} \quad (3a)$$

$$\text{Edge(put)} = \begin{cases} \dfrac{\%ITM \times (\text{Strike Price} - TSP - \text{Put Premium}) - (100\% - \%ITM) \times \text{Put Premium}}{\text{Put Premium}}, & \text{if} > 0. \\ 0, & \text{otherwise} \end{cases} \quad (3b)$$

Yet a further column 34 may show values of Actual. Actual may be represented in the form of a percentage (but is not limited thereto) that may represent a percentage positive return of each option at the TSP upon expiration (on the expiration date 12). Actual may be computed as follows:

$$\text{Actual(call)} = \begin{cases} \dfrac{(TSP - \text{Strike Price} - \text{Call Premium})}{\text{Call Premium}}, & \text{if} > 0; \\ 0, & \text{otherwise} \end{cases} \quad (4a)$$

$$\text{Actual(put)} = \begin{cases} \dfrac{(\text{Strike Price} - TSP - \text{Put Premium})}{\text{Put Premium}}, & \text{if} > 0. \\ 0, & \text{otherwise} \end{cases} \quad (4b)$$

As discussed above, these quantities may be shown in a further information display 300. However, they may also be used to determine recommendations for options for the user, which may also be displayed on enhanced options display 200 and/or further information display 300.

Choosing an option to recommend may involve identification of what the market expects, as opposed to what the user expects. Conceptually speaking, the market price for any asset at any time may correspond to the point at which the expectations of future risk and future reward for that asset are evenly balanced. With options, the market prices (i.e., the amounts that set the market prices of options contracts) are the call and put premiums. Therefore, the market's expectations may be reflected in these premiums. RR$ may be thought of as translating these into an asset price that makes it simpler to understand; that is, RR$ may be thought of as the market's expected asset price at expiration of the options that balances the risk and reward. Considering call options as an example (and the discussion/analysis presented here applies to put options, as well, substituting corresponding quantities for put options and, in some cases, reversing comparisons), if the TSP chosen by the user is greater than RR$ (regarding put options, the opposite would be considered), then the option would have (positive) Edge, which may be obtained using Edge(call), in Equation (3a), which, in the further information display 300 of FIG. 3, may be shown as a positive number in the entry for the particular option.

However, it is generally the case that more than one option may have positive Edge. Therefore, the question of which option to recommend to the user still remains unanswered. The deciding factor in making a recommendation may lie in the user's confidence entry 20b, which, again, represents how confident the user is that the user's entered TSP 20a will be reached by the option expiration date 12 (again, based on American-style options).

In particular, user confidence level 20b may be used to shift the user toward different options having positive Edge. In general, higher confidence 20b may shift the recommendation toward strike prices that are farther away from the asset's current price (shown in field 11), and which may be farther OTM (i.e., higher strike prices for calls or lower strike prices for puts), while lower confidence 20b may shift the recommendation toward strike prices that are closer to the asset's current price, and which may be farther ITM (i.e., lower strike prices for calls or higher strike prices for puts).

Figure 4:
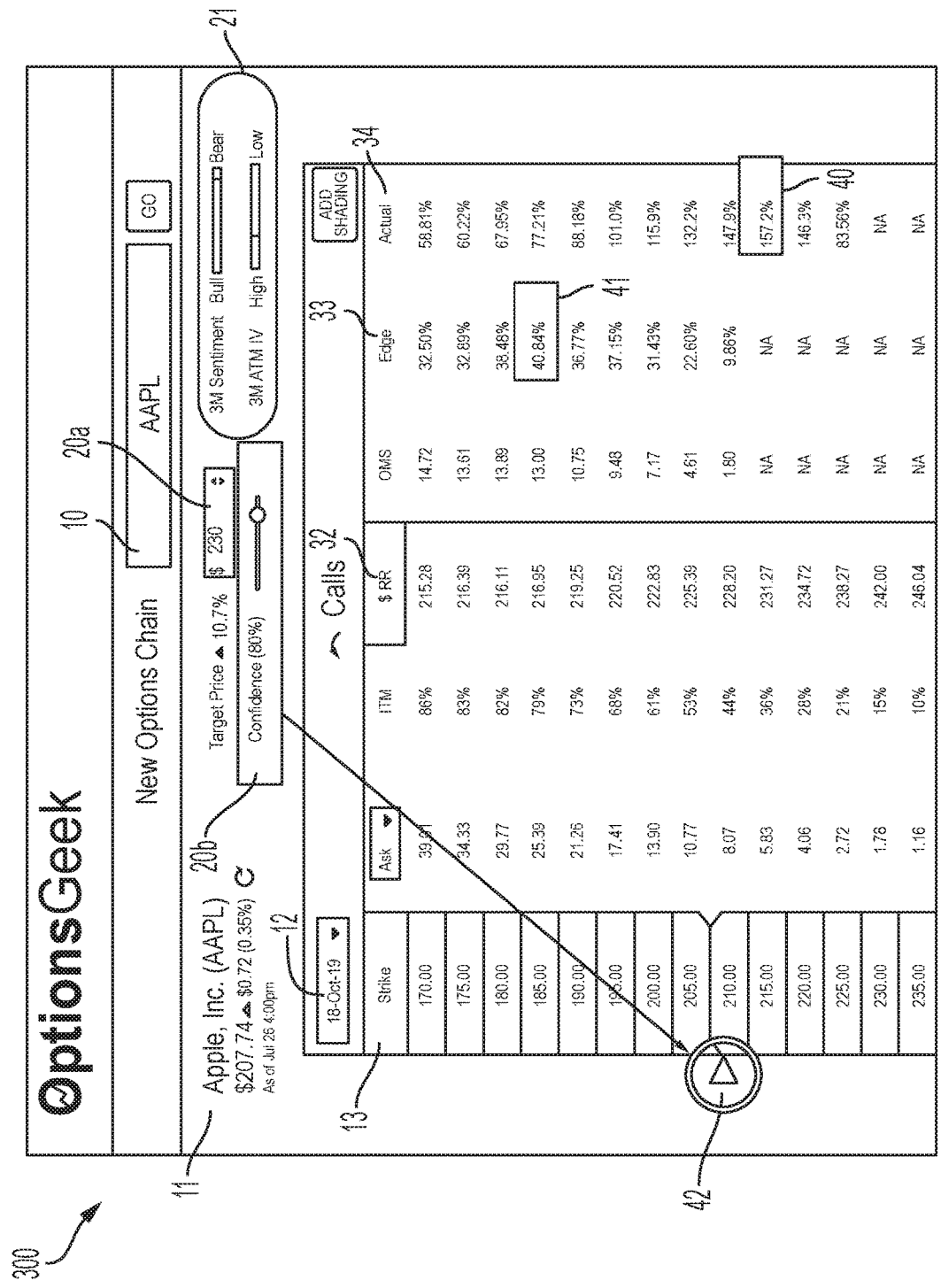
FIG. 4 shows a further example of a further information display according to an aspect of this disclosure.

FIG. 4 shows an illustrative example of how options recommendations may work and may be displayed to the user, although the invention is not thus limited. The confidence level 20b will lie between two extremes, 0% and 100% (or the equivalents, using some other scale; without loss of generality, this discussion will consider confidence level as a percentage). Therefore, a region of possible recommendations of options may lie between an option that would be recommended if the user has 0% confidence and an option that would be recommended if the user has 100% confidence. As shown in FIG. 4, the first extreme (corresponding to a 100% confidence level (again, that the asset will reach its TSP 20a by the expiration date 12)) may be selected as the option/strike price corresponding to the highest Actual, indicated by reference numeral 40. The second extreme, indicated by reference numeral 41, may correspond to the option/strike price corresponding to the highest Edge. Options/strike prices outside these extremes may thus not be appropriate recommendations to the user, given the entered TSP 20a and confidence level 20b. According to an aspect of this disclosure, the region of possible acceptable options/strike prices, i.e., those between the two extremes, may be given special shading or highlighting or a special font or font color or the like, or combinations thereof.

To select a particular option/strike price (and this is all for a particular asset 10 and for a particular expiration date 12), an indicator 42 may be moved between the extreme points 40, 41, based on the user's actual entered confidence level 20b; this relationship between the confidence level 20b and the position of the indicator 42 is emphasized in FIG. 4 by the arrow between these two items (and this arrow is not actually displayed). The indicator 42 may be an arrow, as shown in the example of FIG. 4, or it may be some other type of indicator, for example, but not limited to, a non-arrow-shaped indicator, a particular shading or highlighting of the recommended option in the display, a further portion of the display (not shown) that gives the recommended option, a particular font or font color for the recommended option, or combinations of these and/or of an arrow. Note that in the case of an arrow or non-arrow-shaped indicator, such indicators may be placed in more than one location (e.g., on each side of the recommended option) to indicate the recommended option. As a further option, a line or bar across the display may serve as an indicator.

Additionally, while, in FIG. 4, the extremes 40, 41 are shown as boxes surrounding numbers in the Edge and Actual columns 33, 34, they could be shown in corresponding columns for put options (not shown), or they could be shown with respect to the RR$22 or the strike price column 13.

Accordingly, they also may be shown in display 200, as will be discussed below. Furthermore, the indicators of the extremes need not be boxes, as shown, but they could, alternatively, be types of shading (which may include shading a region between the extremes 40, 41, which may indicate a range of options that may be recommended (based on input confidence level 20b)), different colors or types of fonts for the extremes 40, 41, lines across the display, etc.

According to one aspect of this disclosure, the indicator 42 may move linearly between the extremes 40, 41, according to the confidence level 20b. However, the relationship between the position of indicator 42 and confidence level 20b need not be linear. For example, and the invention is not thus limited, the relationship between the confidence level and the position of indicator 42 between extremes 40, 41 may be a normal or lognormal relationship.

It is further noted, according to an aspect of this disclosure, that although FIG. 4 (and other drawings) may show many different data fields in the various columns, when indicating one or more options recommendations, an abbreviated version of the display may be provided; this may be provided as a user option, using a further button or a display selection menu (not shown). In a non-limiting example, to simplify the display, the OMS, Edge and Actual columns may be omitted. In this particular example, only the strike price 13, options price (shown as "Ask" in FIG. 4, but may be "Bid," if selected), ITM and $RR 32 columns may be displayed, along with the indicator 42, along with at least the fields 10, 11, 20*a*, and 20*b*. In other examples, other columns may be omitted or left in.

Figure 5A:
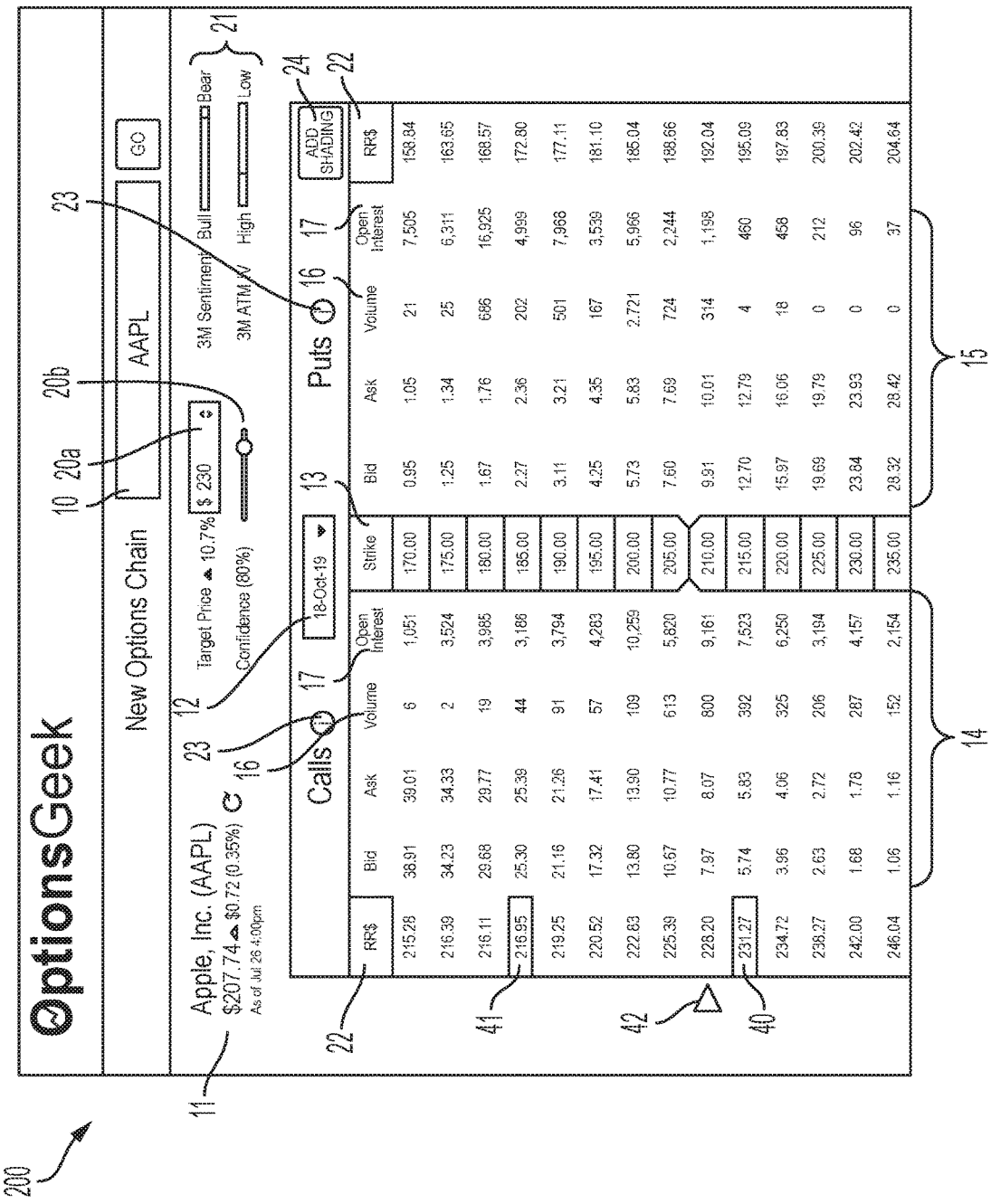
FIGS. 5A-5C show conceptual examples of recommendations according to an aspect of this disclosure.
Figure 5B:
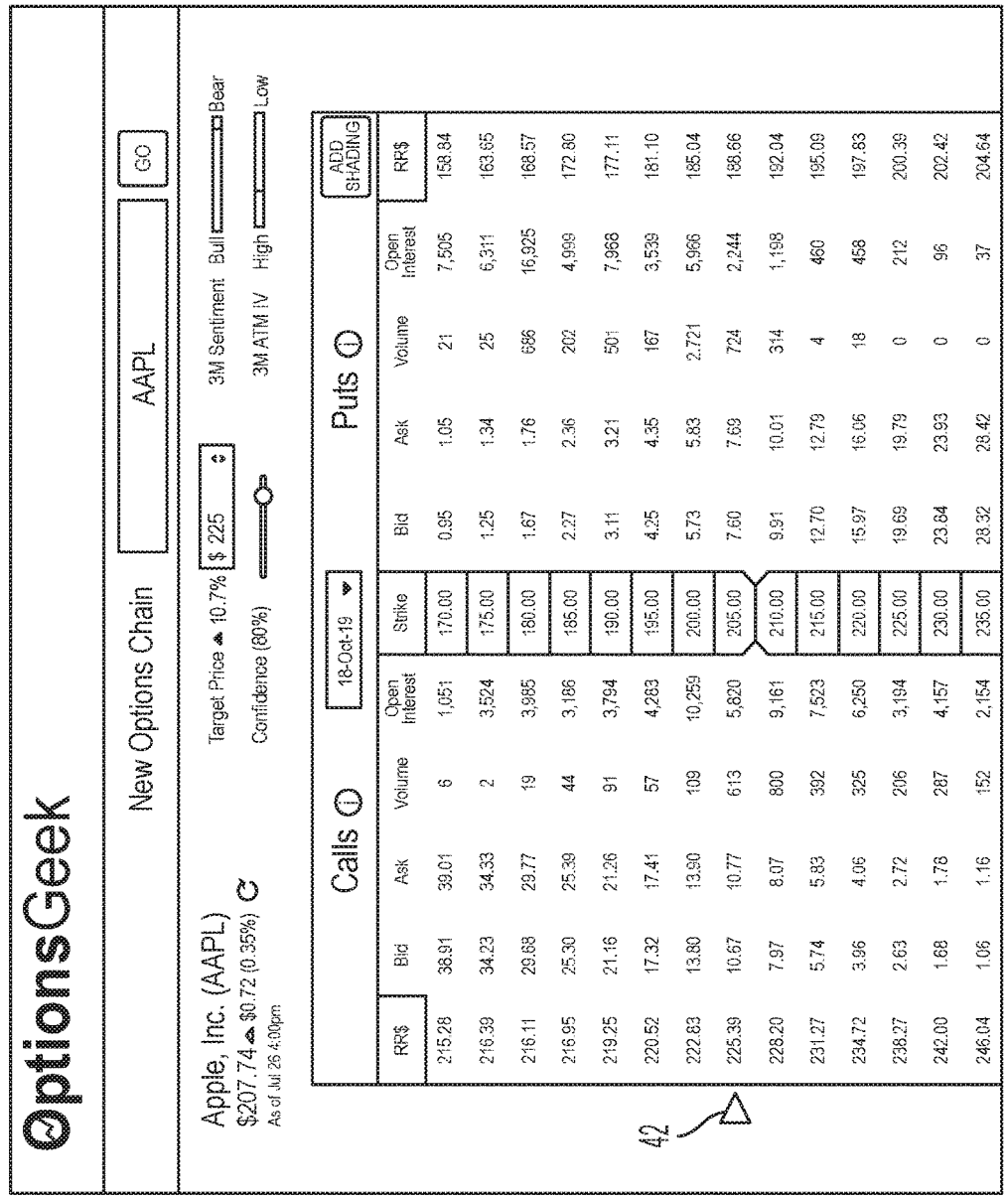
Figure 5C:
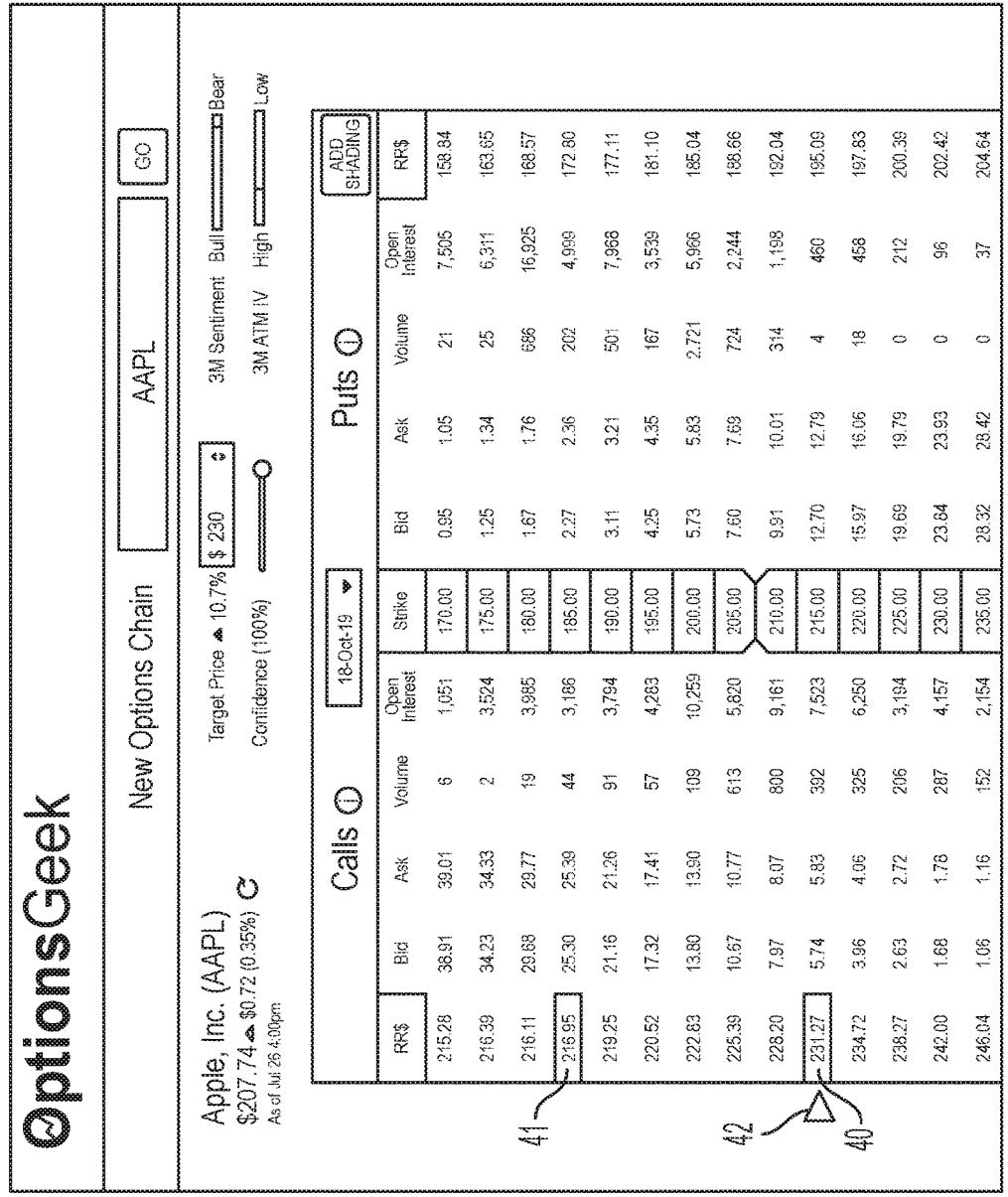

FIGS. 5A-5C show examples using a linear relationship between confidence level 20*b* and position of the indicator 42, according to an aspect of the present disclosure. This is shown on enhanced options chain 200 but could also be shown using an enhanced information display 300 for a given type of option (put or call) of interest to the user. In FIG. 5A, the user has entered a TSP 20*a* of $230 and a confidence level 20*b* of 80%, with an expiration date of 18 Oct. 2019. Indicator 42 may then indicate a recommendation to purchase options with a strike price 13 of $210, which may be based on the above-discussed methodology. In FIG. 5B, the user has changed the entered TSP 20*a* to $225, while maintaining an 80% confidence level 20*b*; this may have the effect of changing the values of Edge and thus moving the range within which the indicator 42 may fall (not shown). Indicator 42 may now indicate a recommendation of options having a strike price of $205. In FIG. 5C, the entered TSP 20*a* is again $230, but the confidence level 20*b* has been changed to 100%. Again, based on the methodology discussed above, the indicator 42 may indicate a recommendation to purchase options at a strike price of $215.

It is possible that the indicator 42 may not land exactly on a particular option/strike price, but may straddle or fall between two options/strike prices. In such a case, the user may need to decide between the more aggressive option and the less aggressive option when choosing options to purchase. FIGS. 5A and 5C correspond to the same TSP 20*a* ($230) and expiration date 12 as FIG. 4. The corresponding extreme points 40, 41 are shown in FIGS. 5A and 5C in conjunction with RR$ column 22 (and, of course, if put options are being evaluated, these indications may be shown on the put-side RR$ column). Extreme points 40, 41 may also be indicated around the corresponding strike prices 13 or in other formats, such as lines across the display, shadings of a region bounded by the extreme points 40, 41, etc., as discussed above. As may be seen by contrasting FIGS. 4 and 5A with FIG. 5C, in the former two figures, the indicator, which corresponds to an 80% confidence level 20*b*, may recommend purchasing call options at a strike price of $210, while if, all other things being unchanged, the confidence level 20*b* is changed to 100%, as in FIG. 5C, the indicator may move to the option at the extreme point 40, corresponding in FIG. 5C to a strike price 13 of $215. That is, again, all other things being equal, indicator 42 may move within the range of options bounded by extreme points 40, 41 based on the user's confidence level 20*b*.

The above-described use of one or more indicators, lines, shadings, fonts, colors, etc., or combinations thereof, may serve to efficiently provide a display that is easily read and requires minimal user interpretation. It may also enable efficient display updating when user inputs are changed.

For example (and the following techniques may be generalized beyond the present example), according to some aspects of the present disclosure, the indications may be updated in real-time, or near-real-time, as the user changes the target strike price and/or the confidence level. For example, in the case of a slider used for confidence level, as the user slides the slider in one direction or another, the system may dynamically change the indications output to the display, as described above. This may be due to the user interface providing the underlying computing facility with (near-)real-time information so that (near-)real-time information may be provided in the display, which may appear to be changing as the user changes the value. This may be more efficient than an entire display refresh, as it may merely require changing a portion of the output, rather than the entire display. That is, according to an aspect of the present disclosure, the display may be updated "differentially" (i.e., in such a way that only the relevant portions (e.g., image pixels) are updated when user inputs change), rather than updating an entire output image. It is further noted that such differential updating may be used even for non-real-time updating, which may, again, provide display efficiency.

Figure 6:
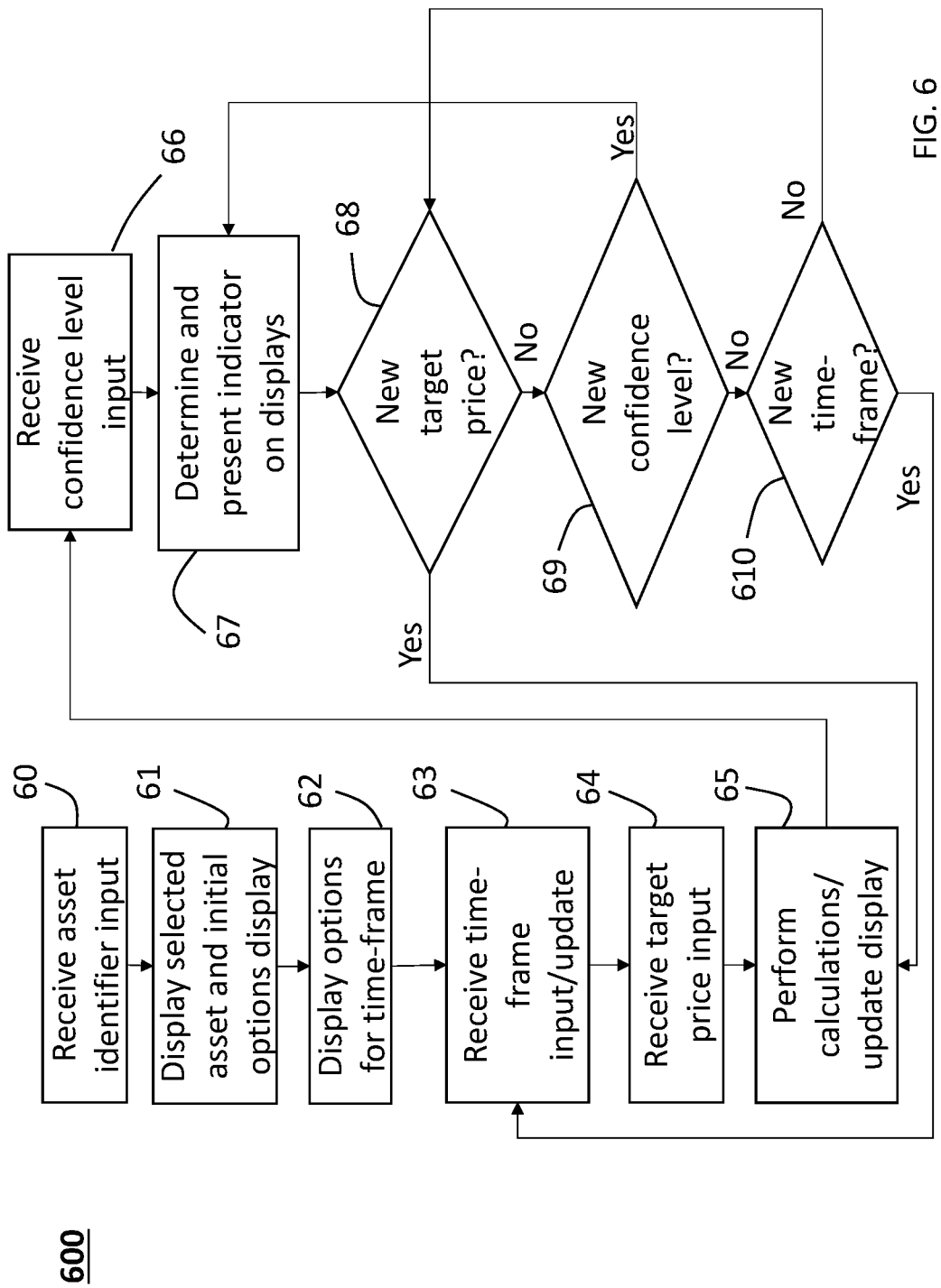
FIG. 6 shows a conceptual flowchart according to an aspect of this disclosure.

FIG. 6 shows a conceptual flowchart of operations that may be performed according to aspects of this disclosure. The system may initially present a display to the user (e.g., but not limited to, on a web page or in a mobile application or on a kiosk) that may enable the user to enter an indicator of an asset 10 (not shown in FIG. 6). After user input to field 10, the system may receive the user input 60 regarding a particular asset for which the user may be interested in options. The system may then display 61 the selected asset and may display an initial enhanced options chain (e.g., 200) for that asset for a given time-frame 12, which may trigger the presentation 62 of a menu of candidate time frames when selected, or simply when rolled over (e.g., by a cursor). Alternatively, there may be some other field or fields presented to permit the user to enter a time-frame (e.g., date, month and year fields, which may or may not present specific choices). The user may then select a time-frame, which may be received 63 by the system, which may then update the enhanced options chain 200. The system may then receive 64 a target asset price input entered by the user, e.g., in a field 20*a*, and may then perform the calculations 65, as discussed above, that may populate/update the further information display 300. The system may then receive 66 a confidence level entered by the user, e.g., in a field 20*b* (again, as discussed above, there are a number of ways in which confidence level may be input), in that the actual asset price will reach the target asset price within the selected time-frame. The system may then determine, based on the confidence level, where to place indicator 42 and may show indicator 42 on whichever display, enhanced options chain 200 or further information display 300 (for put or call options, as may be applicable/selected by the user), may be being viewed 67, as discussed above, and may present 67 a modified display that may reflect the user inputs. At this point, the user may be finished; alternatively, the user may wish to review other possibilities. In such case, the user may change target asset price and/or confidence level and/or time-frame. The system may detect 68 if the user has changed target asset price. If yes, operations may return to block 65 for updated calculations and displays. If no, the system may detect if the user has modified her confidence level 69. If yes, then the process may loop back to block 67 to determine and present a new indicator 42 (which may comprise moving the position of indicator 42). If no, then the system may check 610 if the user has changed the desired time-frame. If not, the system may continue to monitor 68, 69 for changes in target asset price and/or confidence level. If the user has changed the time-frame, operations may return to block 63, which may update the display. It is noted that block 64 may then be skipped if the user has not changed the target asset price (and the calculations/display may be updated 65), and/or block 66 may be skipped if the user has not changed the confidence level, and in such case, the process may skip to block 67 to determine and display indicator 42 for the new target date, and same target price and/or confidence level. It is noted that various selections (e.g., if the user changes the time-frame, the system may explicitly check immediately thereafter to see if the user has entered a new target asset price and/or confidence level, which is implied by the statement above that blocks 64 and 65 may be skipped if this does not happen), idle states and a quit option/end state are not explicitly shown in FIG. 6 (but may be implied, e.g., by previous discussion); rather, FIG. 6 shows only an example of a significant subset of an overall process.

Figure 7:
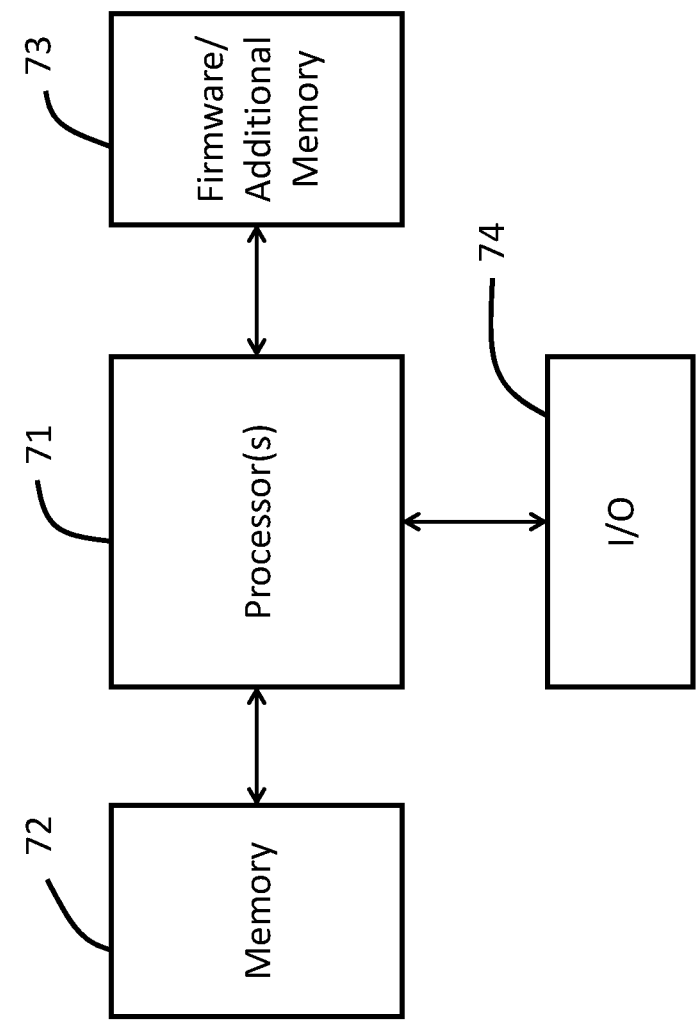
FIG. 7 shows a conceptual system block diagram in which various aspects of the present disclosure may be implemented.

FIG. 7 shows a conceptual block diagram of an apparatus that may be used in various implementations of aspects of this disclosure. The apparatus of FIG. 7 may include one or more processing devices 71. The one or more processing devices 71 may interface with memory 72, firmware and/or additional memory 73 and/or input/output interface(s) ("I/O") 74. Memory 72 and/or firmware/additional memory 73 may incorporate instructions embodied thereon that may be executed by processing device(s) 71 and may include instructions that may cause the processing device(s) to implement all or some of the operations described above (as well as other processes, such as, but not limited to, one or more operating systems that may be used for basic functionality of the processing device(s)). I/O 74 may include, for example, but is not limited to, one or more keyboard(s), computer mice, touch screen(s), display(s), I/O processor(s), speaker(s), communications interface(s) (e.g., to facilitate wired and/or wireless communications via one or more communication channels and/or the Internet) and/or other I/O-related devices. Some or all of blocks 71-74 may be integrated into a single chip or may be incorporated onto a single processor board, or subsets of blocks 71-74 may be separate devices that may be communicatively connected.

Various aspects of the disclosure have been presented above. However, the invention is not intended to be limited to the specific aspects presented above, which have been presented for purposes of illustration. Rather, the invention extends to functional equivalents as would be within the scope of the appended claims. Those skilled in the art, having the benefit of the teachings of this specification, may make numerous modifications without departing from the scope and spirit of the invention in its various aspects.

What is claimed is:

1. A computer-implemented method of providing American-style options-related information to a user, the method including:
   providing, by a computing system, on a display device communicatively coupled to the computing system, a graphical user interface comprising:
      an asset entry field to facilitate entry by the user of an indicator of a desired asset for underlying options in which the user is interested;
      a target price entry field to facilitate entry by the user of a target price for the asset to reach;
      a confidence level entry field to facilitate entry by the user of the user's level of confidence that a price of the asset will reach the entered target price;
      a market conditions field containing information about market conditions for American-style options related to the asset; and
      at least one table showing an options chain for the desired asset;
   receiving, by the computing system, via the graphical user interface, user entries of the target price via the target price entry field and the user's level of confidence via the confidence level entry field;
   automatically determining, by the computing system, a recommendation, for purchase by the user, of an American-style put or call option for the asset based at least in part on the entered target price and user's level of confidence; and
   automatically providing an indication of the recommendation on the graphical user interface, on the at least one table.

2. The method of claim 1, wherein the confidence level entry field includes a slider or a dial to permit the user to adjust the level of confidence.

3. The method of claim 1, further including:
   receiving, via the confidence level entry field, an adjustment to the user's level of confidence; and
   changing the indication of the recommendation on the graphical user interface as the recommendation is re-determined based on the adjustment to the user's level of confidence.

4. The method of claim 3, wherein the changing the indication is performed without changing other portions of the graphical user interface.

5. The method of claim 3, wherein the changing the indication is performed so as to be perceived by the user as changing occurring substantially as the user adjusts the user's level of confidence.

6. The method of claim 1, wherein the graphical user interface further comprises a expiration date entry field to facilitate user entry of an options expiration date.

7. The method of claim 1, wherein the determining a recommendation of an American-style put or call option comprises:
   determining, for respective ones of various American-style put or call options available for the given asset and for a given options expiration date, a mathematical edge received when the respective option at a respective strike price is purchased, and an actual positive return of the respective option at the respective strike price upon expiration;
   determining, among the various American-style put or call options available for the given asset and for a given expiration date, a put or call option having a maximum mathematical edge and a put or call option having a maximum actual positive return; and
   considering the various put or call options available for the given asset and for the given expiration date in order of strike price, determining the recommendation as a put or call option lying within a range of put or call options having strike prices between the strike price of the put or call option having the maximum mathematical edge and the put or call option having the maximum actual positive return,
   wherein the above processes are performed separately for put options and for call options.

8. The method of claim 7, wherein the determining a recommendation of an American-style put or call option further comprises providing an indicator that indicates an option strike price level within the range of put or call options, wherein a position of the indicator is determined as a function of the user's level of confidence.

9. The method of claim 8, wherein the position of the indicator is determined as a linear function of the user's level of confidence.

10. The method of claim 1, wherein providing the indication of the recommendation comprises at least one type of indication selected from the group consisting of: one or more arrows or non-arrow-shaped pointing indicators; shading; highlighting; one or more fonts; and one or more lines or bars.

11. A non-transitory computer-readable medium containing executable instructions designed to cause a computing device to implement operations including:
 providing, by the computing device, on a display device communicatively coupled to the computing device, a graphical user interface comprising:
  an asset entry field to facilitate entry by the user of an indicator of a desired asset for underlying options in which the user is interested;
  a target price entry field to facilitate entry by the user of a target price for the asset to reach;
  a confidence level entry field to facilitate entry by the user of the user's level of confidence that a price of the asset will reach the entered target price;
  a market conditions field containing information about market conditions for American-style options related to the asset; and
  at least one table showing an options chain for the desired asset;
 receiving, by the computing device, via the graphical user interface, user entries of the target price via the target price entry field and the user's level of confidence via the confidence level entry field;
 automatically determining, by the computing system, a recommendation, for purchase by the user, of an American-style put or call option for the asset based at least in part on the entered target price and user's level of confidence; and
 automatically providing an indication of the recommendation on the graphical user interface, on the at least one table.

12. A system configured to provide American-style options-related information to a user, the system comprising:
 one or more processors;
 an input/output (I/O) interface, communicatively coupled to the one or more processors and configured to receive input from a user and to display output information to the user, wherein the input and output are performed via a graphical user interface; and
 one or more memories, communicatively coupled to the one or more processors and having stored therein instructions designed to cause the one or more processors to implement operations including:
  providing, on a display of the I/O interface, the graphical user interface, wherein the graphical user interface comprises:
   an asset entry field to facilitate entry by the user of an indicator of a desired asset for underlying options in which the user is interested;
   a target price entry field to facilitate entry by the user of a target price for the asset to reach;
   a confidence level entry field to facilitate entry by the user of the user's level of confidence that a price of the asset will reach the entered target price;
   a market conditions field containing information about market conditions for American-style options related to the asset; and
   at least one table showing an options chain for the desired asset;
  receiving user entries of the target price, via the target price entry field, and the user's level of confidence, via the confidence level entry field;
  automatically determining a recommendation, for purchase by the user, of an American-style put or call option for the asset based at least in part on the entered target price and user's level of confidence; and
  automatically providing an indication of the recommendation on the graphical user interface, on the at least one table.

13. The system of claim 12, wherein the confidence level entry field includes a slider or a dial to permit the user to adjust the level of confidence.

14. The system of claim 12, the operations further including:
 receiving, via the confidence level entry field, an adjustment to the user's level of confidence; and
 changing the indication of the recommendation on the graphical user interface as the recommendation is re-determined based on the adjustment to the user's level of confidence.

15. The system of claim 14, wherein the changing the indication is performed without changing other portions of the graphical user interface.

16. The system of claim 14, wherein the changing the indication is performed so as to be perceived by the user as changing occurring substantially as the user adjusts the user's level of confidence.

17. The system of claim 12, wherein the graphical user interface further comprises an expiration date entry field to facilitate user entry of an options expiration date.

18. The system of claim 12, wherein the determining a recommendation of an American-style put or call option comprises:
 determining, for respective ones of various American-style put or call options available for the given asset and for a given options expiration date, a mathematical edge received when the respective option at a respective strike price is purchased, and an actual positive return of the respective option at the respective strike price upon expiration;
 determining, among the various American-style put or call options available for the given asset and for a given expiration date, a put or call option having a maximum mathematical edge and a put or call option having a maximum actual positive return; and
 considering the various put or call options available for the given asset and for the given expiration date in order of strike price, determining the recommendation as a put or call option lying within a range of put or call options having strike prices between the strike price of the put or call option having the maximum mathematical edge and the put or call option having the maximum actual positive return,
 wherein the above processes are performed separately for put options and for call options.

19. The system of claim 18, wherein the determining a recommendation of an American-style put or call option further comprises providing an indicator that indicates an option strike price level within the range of put or call options, wherein a position of the indicator is determined as a function of the user's level of confidence.

20. The system of claim 19, wherein the position of the indicator is determined as a linear function of the user's level of confidence.

21. The system of claim 12, wherein providing the indication of the recommendation comprises at least one type of indication selected from the group consisting of: one or more arrows or non-arrow-shaped pointing indicators; shading; highlighting; one or more fonts; and one or more lines or bars.

* * * * *